(12) United States Patent
Hashim et al.

(10) Patent No.: US 8,716,505 B2
(45) Date of Patent: May 6, 2014

(54) REFINING OF EDIBLE OIL

(75) Inventors: Khairuddin Hashim, Selangor (MY); Mohd Suria Affandi Yusoff, Selangor (MY); Razam Adb Latip, Selangor (MY); Ananthan Krishnan, Selangor (MY)

(73) Assignee: Sime Darby Research Sdn. Bhd., Selangor (MA)

( * ) Notice: Subject to any disclaimer, the term of this patent is extended or adjusted under 35 U.S.C. 154(b) by 278 days.

(21) Appl. No.: 13/142,672

(22) PCT Filed: Dec. 31, 2009

(86) PCT No.: PCT/MY2009/000224
§ 371 (c)(1),
(2), (4) Date: Jun. 29, 2011

(87) PCT Pub. No.: WO2010/080019
PCT Pub. Date: Jul. 15, 2010

(65) Prior Publication Data
US 2011/0275843 A1    Nov. 10, 2011

(30) Foreign Application Priority Data
Jan. 8, 2009   (MY) ............................... PI 20090069

(51) Int. Cl.
*C11B 3/06*        (2006.01)
*C07C 59/147*   (2006.01)

(52) U.S. Cl.
USPC ........... 554/175; 554/121; 554/195; 554/199; 554/200; 554/201

(58) Field of Classification Search
None
See application file for complete search history.

(56) References Cited

FOREIGN PATENT DOCUMENTS

| AU | 632272 B | 9/1989 |
|---|---|---|
| MY | 124490 A | 6/2006 |
| WO | 98-18888 A1 | 5/1998 |
| WO | 2007-090545 A1 | 8/2007 |

*Primary Examiner* — Yate K Cutliff
(74) *Attorney, Agent, or Firm* — Lowe Hauptman & Ham, LLP

(57) ABSTRACT

The present invention discloses a commercial process for the production of refined palm oil rich in natural carotene. The process for the production of natural carotene rich refined oil comprises the steps of: (i) fractionating crude palm oil to form a liquid fraction and a solid portion; (ii) separating the liquid fraction from the solid portion; (iii) degumming the liquid fraction; (iv) neutralizing the degummed liquid fraction to substantially remove free fatty acids and impurities; (v) washing off the soap resulting from the neutralization step; and (vi) deodorizing the neutralized the product of step (v) to remove remaining free fatty acids and other impurities contained therein, thus forming a refined palm oil that contains less than 0.1% free fatty acid, has a carotene content retained of about 75%, an iodine value of less than 60 and a peroxide value of zero.

11 Claims, No Drawings

REFINING OF EDIBLE OIL

RELATED APPLICATIONS

The present application is a National Phase of International Application Number PCT/MY2009/000224, filed Dec. 31, 2009 and claims priority from, Malaysia Application Number PI 20090069, filed Jan. 8, 2009.

The present invention relates to a process of refining edible oil rich in natural occurring carotene. More particularly, the present invention relates to a process of refining palm oil whereby substantially a large amount of the naturally occurring carotene is retained in the refined oil.

BACKGROUND TO THE INVENTION

Carotenes are yellow to orange pigments found in carrots, leafy vegetables, milk fat and egg yolk. The a- and b-carotenes are associated with synthesis of vitamin A in the liver and may offer some protection against cancer as well.

It is a known fact that crude palm oil is rich in carotenes-a class of C40 polyunsaturated hydrocarbons. Commercially cultivated oil palm yield crude palm oil, which contains 500-700 ppm carotenes of which α and β carotenes form 90% of the total carotenes. However, newer clones or species of oil palm trees can produce crude palm oil with carotene concentrations of 1000-3000 ppm. Since the carotenes are natural compounds and since they all show pronounced pro-vitamin A activity, they are widely used as antioxidants or as dyes in commercial applications in the pharmaceutical industry, in the food industry and in the manufacture of cosmetics. More recently, the tumor-inhibiting activity of beta-carotene has been repeatedly demonstrated so that it is now also used in the prophylaxis of cancer.

At present edible palm oil is used in the refined, bleached and deodorized form. However, the refining process of producing refined, bleached and deodorized form of oil commonly adopted in palm oil refining industry results in the carotenes being destroyed while the oil is being deodorized and deacidified. The refined oil of the prior art process normally has a free fatty acid (FFA) content of less than 0.1%, carotene content of less than 20 ppm and colour of less than 3 red in a 5¼ cell (Lovibond Scale). Prior art refining process of crude palm oil in summary involve deodorizing at temperatures between 240° C.-260° C. and at a pressure of 0.1-0.4 kPa, which result in not only the removal of unwanted fatty acids but also all carotenes being destroyed. Alpha (α), beta (β), gamma (γ) and zeta (ζ), zeacarotene, cis a-carotene, cis b-carotene and lycopene are destroyed.

In prior art plant configurations, degassing of the crude palm oil and deodorizing of the degassed oil is done within the same equipment. The typical operating temperature is between 240° C. and 260° C. At this temperature levels, unwanted free fatty acids (FFA) are removed, but in the process all carotenes are broken down. If the operating temperature is lowered, then FFA is not completely removed to meet the specification stipulated for edible oil and the end product is not completely deodorized and the taste is not bland.

in recent times, attempts had been made to produce refined palm oil wherein the naturally occurring carotenes are retained in substantially large quantities.

AU-B-31084189 discloses an improved process for the refining of edible palm oil substantially without destroying the carotenes present in the oil which process comprises the step of subjecting the oil to a pressure of less than 0.008 kPa and a temperature of less than 200° C. According to this invention, palm oil or a product of palm oil is passed through a deodorizer, preferably at a temperature in the range 100° C. to 200° C. and at a pressure of up to 0.008 kPa. During this process the free fatty acids are distilled over and the oil deodorized, but the carotenes are not destroyed. This deodorized palm oil has a free fatty acid content of less than 0.12%. Carotene content and peroxide values are almost the same as before the process. The refined oil has a bland smell. The examples disclosed in the Australia patent, refer to laboratory scale reproductions of the invention. However, on repeating the examples on a pilot plant scale or on a commercial plant scale showed different results. It was not possible to obtain yield of refined palm oil with the characteristics shown in Tables 1, 2, 3 or 4 of the AU Patent.

MY-124490-A discloses modifications to conventional process of refining crude palm oil so that carotene content is substantially retained but devoid of other impurities. The modifications comprise (i) repeating neutralization step at least once at 80° C. to remove free fatty acids from the palm oil; (ii) removing the remaining free fatty acid and other impurities by deodorization at relatively low temperatures, i.e. about 150° C.; and (iii) crystallizing and fractionating the palm oil at relatively low temperature, i.e. 65° C., to maintain the clarity of the final product. The refined palm oil contains less than 0.1% free fatty acid, has a carotene content retained of about 70%, a cloud point of less than 10° C. and an iodine value of more than 60.

However, the above-mentioned Malaysian patent has several disadvantages.

Firstly, the refined palm oil contains high amount of peroxides which deteriorates the quality of the oil. After deodorization step, the oil undergoes fractionation, whereby the oil is heated up to 65° C. This leads to an increase of peroxides in the final product or refined oil, which deteriorates quality of the refined oil as time passes. Secondly, repetition of neutralization step incurs more oil losses, thus reducing the yield of the final product (i.e. refined palm oil). Repetition of the neutralization step of at least once also increases the cost of production. Thirdly, gel-like partial glyceride is formed during deodorization, which makes it difficult to filter the oil during the fractionation and crystallization step. Thus, the entire refining process has to be repeated. Further, the examples disclosed in the Malaysian patent, refer to laboratory scale reproductions of the invention. However, on repeating the example on a pilot plant scale or on a commercial plant scale showed different results. It was not possible to obtain yield of refined palm oil with the characteristics shown in the Malaysian patent.

Therefore, it is advantageous to provide an improved process of refining crude palm oil that can overcome at least one the above-mentioned drawbacks, but yet retain substantial carotene content devoid of other impurities.

SUMMARY OF INVENTION

It is an object of the present invention to provide an improved refining process wherein the free fatty acids are removed to an acceptable level and the level of carotene present in crude palm oil is substantially retained in the refined oil.

It is another object of the present invention to provide an improved refining process that can obtain yield of refined palm oil having desired characteristics on a commercial plant scale and in an economical manner.

The present invention discloses a commercial process for the production of refined palm oil rich in natural carotene. The process for the production of natural carotene rich refined oil comprises the steps of:

(a) fractionating crude palm oil to form a liquid fraction and a solid portion;
(b) separating the liquid fraction from the solid portion;
(c) degumming the liquid fraction;
(d) neutralizing the degummed liquid fraction to substantially remove free fatty acids and impurities;
(e) washing off the soap resulting from the neutralization step;
(f) deodorizing the neutralized product of step (e) to remove remaining free fatty adds and other impurities contained therein, thus forming a refined palm oil that contains less than 0.1% free fatty add, has a carotene content retained of about 75%, an iodine value of less than 60 and a peroxide value of zero.

The fractionation step of the present process includes heating the palm oil to 70° C. for 15 minutes with constant and homogenizing stirring, followed by cooling to 19° C. so that the solid portion (i.e. stearin and other solid fats) of the oil is separated from the liquid fraction (i.e. olein).

It will be apparent to a person skilled in the art that the liquid fraction (olein) and the solid portion (stearin and other solid fats) of the fractionated crude palm oil may be easily separated using physical means such as vacuum or press-type filters.

The neutralization step of the present process is carded out at a temperature lower than 85° C. The preferred neutralization temperature is 65° C.

The deodorizing step of the present process is carried out at 155° C. to 165° C. in a vacuum vessel for 4.5 to 5.5 hours. Preferably, deodorization is carded out at 160° C. for 5 hours. This deodorization step eliminates the presence of peroxides in the resultant refined palm oil, which increased after the fractionation step. By eliminating peroxides entirely, the resultant refined palm oil is considered to be of high quality containing less than 0.1% free fatty add.

It is an advantage of the present invention to provide an improved refining process that can obtain yield of refined palm oil having desired characteristics on a commercial plant scale and in an economical manner. The process does not involve expensive equipments such as distiller and condenser. Further, the steps involved are simple and do not involve much cost. For example, neutralization step need not be repeated more than once as required in the prior art. Thus, the cost of production and oil losses can be minimized in the present process.

It is another advantage of the present invention to provide deodorization as the last step to produce refined palm oil. As mentioned in the background art, deodorization induces the formation of gel-like partial glyceride, which makes it difficult for the oil to be filtered during the subsequent step of fractionation, thus requiring the whole process to be repeated. The present process solves this problem by introducing fractionation of crude palm oil as the first step. Thus, formation of gel-like partial glyceride during the last step of deodorization in the present invention does not possess a problem that will require the process to be repeated because the resultant refined palm oil is not subject to filtration.

DETAILED DESCRIPTION OF THE INVENTION

According to the present invention, the crude palm oil is first subjected to fractionation to remove high melting point solids. This is performed at relatively low temperature to ensure the palm oil remains clear for a longer period of time. The crude palm oil is heated at about 70° C. for approximately 15 minutes with constant and homogenizing stirring. It is then cooled slowly to 18° C. using, for example an external flow of cooling water. At this low temperature, the liquid is separated from the solids, i.e. the remaining stearins and solid fats. The separation of liquid palm oil, called crude palm olein (still in red colour), from stearin may be carded out using vacuum or press-type filters.

The fractionated liquid palm oil (or palm olein) is then degummed with concentrated phosphoric add at temperatures below 100° C. for a period of 10 to 30 minutes. Preferably, degumming is cared out at below 85° C. for a period of 15 minutes.

The degummed liquid palm oil (or palm olein) is further neutralized with concentrated alkali, such as sodium hydroxide. This step is carried out at a temperature below 85° C. for a period of 15 minutes. It is preferred that neutralization is cared out at a temperature of 65° C. The amount of alkali used depends on the level of free fatty add present in the degummed oil.

Soap formed as a result of the neutralization reaction is removed from the liquid palm oil (or palm olein) by watering-washing. The palm olein is washed with water until no traces of soap can be found.

Next, the neutralized liquid palm oil (or palm olein) is deodorized at an elevated temperature ranging from 155° C. to 165° C. in a vacuum vessel for a period of 4.5 to 5.5 hours. Preferably, deodorization is carried out at 160° C. in a vacuum vessel for a period of 5 hours. It would be understood to a person skilled in the art that absolute vacuum may not be achievable in an ordinary or industrial vacuum vessel and therefore, there is usually a presence of small residue of pressure of 130 kPa.

The resultant refined palm oil is still red in colour indicating that the carotene content is substantially retained. It contains less than 0.1% free fatty acid, has a carotene content retained of about 75%, an iodine value of less than 60 and a peroxide value of zero.

The present invention will be illustrated by the following example.

EXAMPLE

Crude palm oil was subjected to fractionation to remove high melting point solids. Crude was heated to about 70° C. for 15 minutes with constant and homogenizing stirring. It is then cooled slowly by external cool water to 19° C. so that the liquid fraction is separated from the solid portion, which consists of the remaining stearin and solid fats.

The liquid palm oil, called crude palm olein (still in red colour), was separated from the solid portion by way of vacuum or press-type filter.

The crude palm olein is then degummed using 0.04% by volume of 85% phosphoric acid at a temperature below 85° C. for 15 minutes.

The degummed palm olein is then neutralized with 4N sodium hydroxide solution at 65° C. The soap formed as a result of the neutralization reaction is removed from the palm can by washing with water until no traces of soap can be found.

The neutralized palm olein is then deodorized at 160° C. in a vacuum vessel for 5 hours. Residue pressure was recorded at 130 kPa.

An analysis of free fatty acid content (FFA), peroxide value (PV), iodine value (IV) and carotene content was carried out on the samples at various steps/stages until a final product of refined palm oil is obtained. Results of the analysis are shown in Table 1.

TABLE 1

| Sample | Analysis | | | |
|---|---|---|---|---|
| | FFA, % | PV | IV | Carotene, ppm |
| Crude palm oil | 2.80 | 1.7 | 54.85 | 588 |
| Crude palm olein (after fractionation) | 2.80 | 1.83 | 59.25 | 680 |
| Neutralised palm olein | 0.50 | 2.28 | 59.29 | 680 |
| Refined palm olein (after deodorisation) | 0.08 | Nil | 59.74 | 520 |

Based on the above analysis, there was a reduction in free fatty acid after the crude palm oil was fractionated. The peroxide value increased after fractionation and neutralization steps, but was totally eliminated after deodorization step. The total carotene content increased after fractionation step. Up to 75% of the carotene content was retained after deodorization step.

The final refined palm oil (or palm olein) contained less than 0.1% tree tally acid, has a carotene content retained of about 75%, an iodine value of less than 60 and a peroxide value of zero.

The invention claimed is:

1. A process for refining palm oil which substantially retains the carotene content comprising the steps of:
   (i) fractionating crude palm oil to form a liquid fraction and a solid portion;
   (ii) separating the liquid fraction from the solid portion;
   (iii) degumming the liquid fraction;
   (iv) neutralizing the degummed liquid fraction to substantially remove free fatty acids and impurities;
   (v) washing off soap resulting from the neutralization step; and
   (vi) deodorizing the neutralized the product of step (v) to remove remaining free fatty acids and other impurities contained therein, thus forming a refined palm oil that contains less than 0.1% free fatty acid, has a carotene content retained of about 75%, an iodine value of less than 60 and a peroxide value of zero.

2. A process according to claim 1, wherein the fractionation step includes heating the palm oil to 70° C. for 15 minutes with constant and homogenizing stirring, followed by cooling of the palm oil to 19° C. so that the solid portion (i.e. stearin) of the oil is separated from the liquid fraction (i.e. olein).

3. A process according to claim 1, wherein the neutralization step is carried out at a temperature lower than 85° C.

4. A process according to claim 3, wherein the temperature is 65° C.

5. A process according to claim 1, wherein the deodorizing step is carried out at 155° C. to 165° C. in a vacuum vessel for 4.5 to 5.5 hours.

6. A process according to claim 5, wherein the deodorizing step is carried out at 160° C. in a vacuum vessel for 5 hours.

7. A refined palm oil which substantially retains carotene content produced according to any one of claim 1.

8. A refined palm oil according to claim 7 which contains less than 0.1% of free fatty acid.

9. A refined palm oil according to claim 7 which retains a carotene content of 75%.

10. A refined palm oil according to claim 7 which contains an iodine value of less than 60.

11. A refined palm oil according to claim 7 which contains zero peroxide value.

* * * * *

UNITED STATES PATENT AND TRADEMARK OFFICE
CERTIFICATE OF CORRECTION

PATENT NO. : 8,716,505 B2
APPLICATION NO. : 13/142672
DATED : May 6, 2014
INVENTOR(S) : Khairudin Hashim et al.

It is certified that error appears in the above-identified patent and that said Letters Patent is hereby corrected as shown below:

On the Title Page

Item (75) Inventors: "Khairuddin Hashim" should read --Khairudin Hashim--; and "Razam Adb Latip" should read --Razam Abd Latip--.

Signed and Sealed this
Sixteenth Day of September, 2014

Michelle K. Lee
*Deputy Director of the United States Patent and Trademark Office*